United States Patent [19]
Canterino et al.

[11] Patent Number: 4,579,898

[45] Date of Patent: Apr. 1, 1986

[54] LINEAR POLYETHYLENES STABILIZED AGAINST MELT INDEX DROP WITH AROMATIC SULFONHYDRAZIDES

[75] Inventors: Peter J. Canterino, Towaco; Fred C. Schwab, Metuchen, both of N.J.

[73] Assignee: Mobil Oil Corporation, New York, N.Y.

[21] Appl. No.: 685,586

[22] Filed: Dec. 24, 1984

[51] Int. Cl.$^4$ ............................................. C08K 5/43
[52] U.S. Cl. .................................. 524/168; 524/169; 524/581
[58] Field of Search ....................... 524/168, 169, 581

[56] References Cited

U.S. PATENT DOCUMENTS

| | | | |
|---|---|---|---|
| 3,107,229 | 10/1963 | Malz et al. | 524/169 |
| 3,278,482 | 10/1966 | Leandri | 524/169 |
| 4,031,068 | 6/1977 | Cantor | 524/169 |
| 4,418,170 | 11/1983 | Van Gentzkow et al. | 524/168 |
| 4,452,855 | 6/1984 | Brodsky et al. | 524/168 |

FOREIGN PATENT DOCUMENTS

| | | | |
|---|---|---|---|
| 1330371 | 5/1963 | France | 524/168 |
| 50-151266 | 12/1975 | Japan | 524/168 |
| 910708 | 11/1962 | United Kingdom | 524/169 |

OTHER PUBLICATIONS

"Diimide as a reagent for the Hydrogenation of Unsaturated Polymers"; by Harwood et al., *Die Makromolekulare Chemie* 163 (1973); pp. 1–12.

"Hydrogenation of Unsaturated Polymers With Diimide"; by Mango et al., *Die Makromolekulare Chemie* 163 (1973); pp. 13–36.

*Primary Examiner*—Joseph L. Schofer
*Assistant Examiner*—N. Sarofim
*Attorney, Agent, or Firm*—Alexander J. McKillop; Michael G. Gilman; Edward J. Trojnar

[57] ABSTRACT

The drop in melt index observed when linear polyethylenes are melt processed is reduced by adding a small amount, e.g., about 0.01 to 2 weight percent of an aromatic sulfonhydrazide such as p-toluenesulfonhydrazide.

14 Claims, No Drawings

LINEAR POLYETHYLENES STABILIZED AGAINST MELT INDEX DROP WITH AROMATIC SULFONHYDRAZIDES

BACKGROUND OF THE INVENTION

Linear polymers of ethylene such as high density polyethylene (HDPE) and linear low density polyethylene (LLDPE) exhibit melt index (MI) drop during melt processing, for example, during extrusion. Compositions of this invention are stabilized to reduce the drop in melt index normally experienced.

SUMMARY OF THE INVENTION

This invention relates to compositions comprising a linear polymer of ethylene such as high density polyethylene or linear low density polyethylene copolymers and an amount of an aromatic toluene sulfonhydrazide which is effective to stabilize the composition against a drop in melt index during melt processing.

The aromatic sulfonhydrazide is preferably a benzene or substituted-benzene sulfonhydrazide. Para-toluene sulfonhydrazide has been found to be particularly effective.

The aromatic sulfonhydrazide is incorporated into the composition in effective amounts generally range from about 0.01 to 2 weight percent. The aromatic sulfonhydrazide can be introduced into the composition in any convenient manner, such as by direct addition or by introduction with a master batch containing an ethylene polymer and a higher concentration of the aromatic sulfonhydrazide. The master batches then can be diluted with additional virgin ethylene polymer to achieve the necessary concentration in the composition as disclosed herein.

The compositions can also contain conventional ingredients, such as fillers, antioxidants, stabilizers and the like.

As indicated, the ethylene polymer can be a high density polymer of ethylene or a linear low density polymer of ethylene. Linear low density ethylene polymers are copolymers of ethylene and a higher olefin and contain a sufficient amount of the higher olefin so that the copolymer has a density in the range of about 0.90 to about 0.94, preferably 0.91 to 0.93. The higher olefin is commonly 1-butene, 1-hexene, 4-methyl-1-pentene, or 1-octene. Such materials are disclosed in U.S. Pat. No. 4,076,698, which is incorporated herein by reference in entirety, and are widely available.

The invention is illustrated by the following examples in which all parts are by weight.

EXAMPLES 1-4

Para-toluenesulfonhydrazide (PTSH) 97%, was added to two different resins a linear low density polyethylene (LLDPE) and a high density polyethylene (HDPE) to determine the effect on melt index. Blends were passed through a Brabender twin screw extruder three times successively at 275° C. and 70 rpm. Residence time was 40 seconds. Enough resin was retained after each pass for melt index (MI) determinations which are summarized in Table 1 below.

| EXAMPLE | C-1 | 1 | 2 | C-2 | 3 | 4 |
|---|---|---|---|---|---|---|
| LLDPE | 400 g | 400 g | 400 g | — | — | — |
| HDPE | — | — | — | 400 | 400 | 400 |
| PTSH | — | 0.4 g | 0.8 g | — | 0.4 | 0.8 |

LLDPE — ethylene-hexene copolymer, density 0.925
HDPE — ethylene homopolymer density 0.952

TABLE 1

| Example | M.I. Pass 0 | M.I. Pass 1 | M.I. Pass 2 | M.I. Pass 3 |
|---|---|---|---|---|
| C-1 | 0.93 | 0.35 | 0.23 | 0.15 |
| 1 | — | 0.62 | 0.56 | 0.71 |
| 2 | — | 0.63 | 0.62 | 0.75 |
| C-2 | 0.74 | 0.40 | 0.14 | 0.09 |
| 3 | — | 0.50 | 0.38 | 0.28 |
| 4 | — | 0.61 | 0.41 | 0.44 |

EXAMPLES 5-6

In a manner similar to that described in Examples 1-4 a LLDPE copolymer of ethylene and butene was blended with 0.1% PTSH in the Brabender extruder at 186° C. The Melt Index of the blends was measured and reported in Table 2.

TABLE 2

| | With LLDPE Alone | | | | LLDPE With PTSH | | | |
|---|---|---|---|---|---|---|---|---|
| Pass | 0 | 1 | 2 | 3 | 0 | 1 | 2 | 3 |
| MI | 1.75 | 1.38 | 1.02 | 0.67 | 1.75 | 1.64 | 1.63 | 1.36 |

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

We claim:
1. A composition comprising a linear polymer of ethylene and an aromatic sulfonhydrazide, said sulfonhydrazide being present in an amount sufficient to reduce the drop in melt index when the polymer of ethylene is melt processed.
2. The composition of claim 1 in which said polymer of ethylene is linear low density polyethylene.
3. The composition of claim 1 in which said polymer of ethylene is high density polyethylene.
4. The composition of claim 1 in which said aromatic sulfonhydrazide is p-toluenesulfonhydrazide.
5. The composition of claim 4 in which said p-toluenesulfonhydrazide is present in amounts of 0.01 to 2 weight percent.
6. The composition of claim 4 in which said polymer of ethylene is linear low density polyethylene.
7. The composition of claim 4 in which said polymer of ethylene is high density polyethylene.
8. A method for reducing the melt index drop in linear polyethylenes during melt processing comprising adding thereto an effective amount of aromatic sulfonhydrazide.
9. The method of claim 8 in which said polymer of ethylene is linear low density polyethylene.
10. The method of claim 8 in which said polymer of ethylene is high density polyethylene.
11. The method of claim 8 in which said aromatic sulfonhydrazide is p-toluenesulfonhydrazide.
12. The method of claim 11 in which said p-toluenesulfonhydrazide is present in amounts of 0.01 to 2 weight percent.
13. The method of claim 11 in which said polymer of ethylene is linear low density polyethylene.
14. The method of claim 11 in which said polymer of ethylene is high density polyethylene.

* * * * *